(12) United States Patent
Segall et al.

(10) Patent No.: US 6,796,446 B2
(45) Date of Patent: Sep. 28, 2004

(54) SHAFT ADJUSTMENT APPARATUS AND METHOD

(75) Inventors: Paul M. Segall, El Paso, TX (US); S. Fu Wang, Changhua (TW)

(73) Assignee: La-La Imports LP, El Paso, TX (US)

(*) Notice: Subject to any disclaimer, the term of this patent is extended or adjusted under 35 U.S.C. 154(b) by 0 days.

(21) Appl. No.: 10/338,810

(22) Filed: Jan. 8, 2003

(65) Prior Publication Data

US 2004/0129661 A1 Jul. 8, 2004

(51) Int. Cl.⁷ .............................................. A47B 47/00
(52) U.S. Cl. ....................... 211/206; 211/204; 211/207; 248/412
(58) Field of Search .................... 211/206, 204, 211/189, 175, 207, 183, 123, 105.1, 196; 248/411, 412, 161, 157, 165, 188.5; 403/109.1, 109.5, 367, 368, 374.1, 374.2, 409.1, 350

(56) References Cited

U.S. PATENT DOCUMENTS

| | | | | |
|---|---|---|---|---|
| 2,329,932 A | * | 9/1943 | Nelson | 248/125.2 |
| 2,557,262 A | * | 6/1951 | Cordes | 211/191 |
| 2,805,776 A | * | 9/1957 | Levitin | 211/27 |
| 3,220,743 A | * | 11/1965 | Bernard | 279/28 |
| 3,807,574 A | * | 4/1974 | Lanza | 211/206 |
| 4,113,222 A | * | 9/1978 | Frinzel | 248/412 |
| 4,239,169 A | * | 12/1980 | DeSantis | 248/412 |
| 4,318,526 A | * | 3/1982 | Werner | 248/412 |
| 4,655,354 A | * | 4/1987 | Cohen | 211/199 |
| 4,706,916 A | * | 11/1987 | Cullmann et al. | 248/168 |
| 5,617,962 A | * | 4/1997 | Chen | 211/206 |
| 5,720,369 A | * | 2/1998 | Thorn | 188/300 |
| 6,213,434 B1 | * | 4/2001 | Reichanadter, Jr. | 248/125.8 |
| 6,401,948 B1 | * | 6/2002 | Huang | 211/206 |
| 6,523,707 B2 | * | 2/2003 | Liu | 211/206 |
| 6,609,686 B2 | * | 8/2003 | Malizia | 248/125.8 |
| 2002/0079277 A1 | * | 6/2002 | Huang | 211/206 |
| 2002/0195411 A1 | * | 12/2002 | Liu | 211/206 |

OTHER PUBLICATIONS

Nine photographs of an adjustable garment rack (predating the filing of the present application) (2pgs.).
Whitney Design 2003 Storage & Organization & Organization Products Catalog (select portions, 2 pgs.).
Whitney Design Wholesale Price List, Effective Feb. 1, 2003 (select portions, 2 pgs.).
Whitney Design webpage, http://www.whitney–design.com/freestanding.htm (Printed Feb. 19, 2003) (1 pg.).

* cited by examiner

Primary Examiner—Jennifer E. Novosad
(74) Attorney, Agent, or Firm—Fitch, Even, Tabin & Flannery

(57) ABSTRACT

A method and apparatus for adjusting the relative position between a pair of elongate, tubular shafts using an adjustment mechanism having a wedge element operably moveable along a ramp by shifting of an actuator member. The adjustment mechanism is configured to reduce binding thereof by supporting the actuator member in more than one location to maintain desirable contact between the wedge element and the ramp and the inner wall of the one of the pair of shafts, providing for an increased range of movement of the wedge element along the ramp to prevent undesirable frictional engagement between the actuator member and the ramp, and by providing a stop to substantially maintain the wedge element from unintentionally withdrawing into the inner shaft and wedged therein.

23 Claims, 5 Drawing Sheets

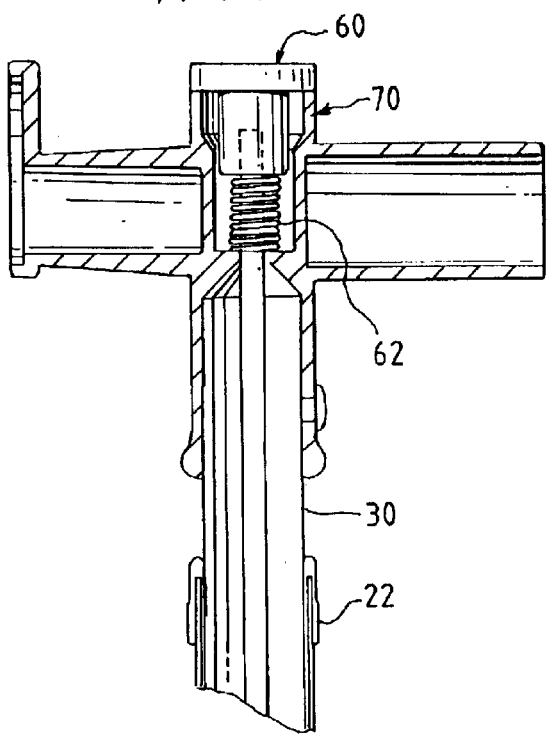
FIG. 4
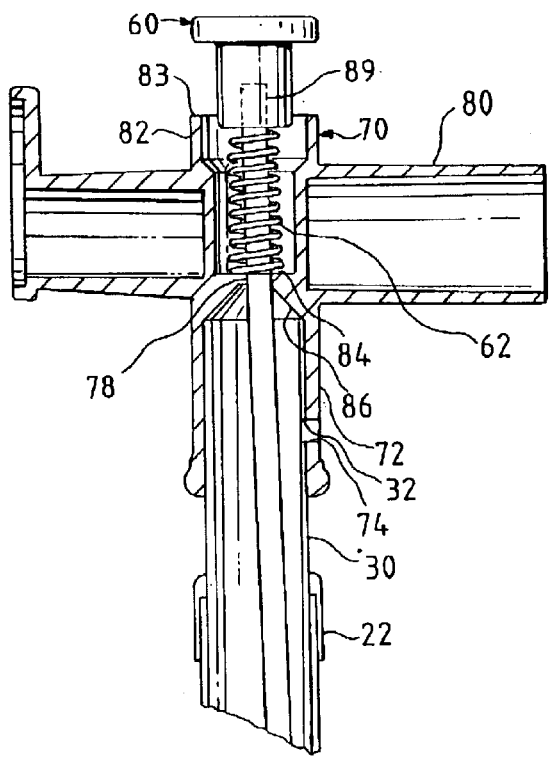
FIG. 5
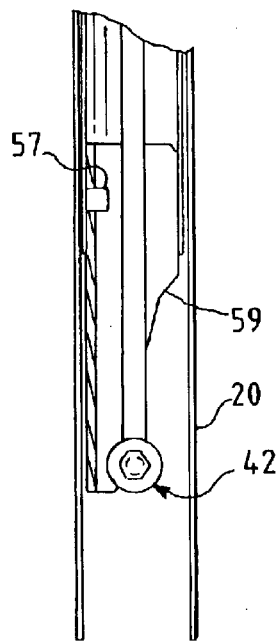
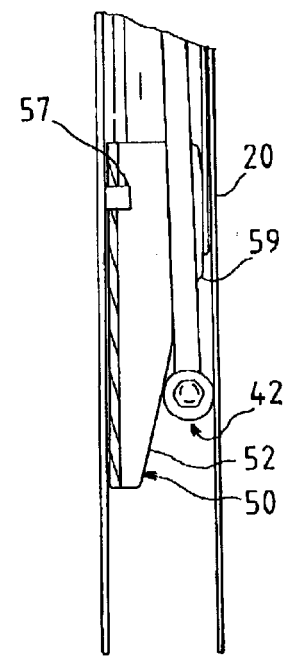

SHAFT ADJUSTMENT APPARATUS AND METHOD

FIELD

The apparatus and methods described herein relate generally to adjustment mechanisms between shafts, and in particular, to adjustment mechanisms between a pair of elongate, tubular shafts.

BACKGROUND

An adjustment mechanism can be used to adjust the relative position between two elongate, tubular shafts. One of the shafts may be at least partially slidable within the other of the shafts, with the adjustment mechanism positioned therebetween selectively engageable to substantially prevent relative sliding between the shafts.

A particular type of adjustment mechanism is used in an adjustable garment rack to permit adjustment of the height of a garment rod relative to a base. A pair of upstanding outer shafts are attached to the base. An inner shaft is slidable within each of the outer shafts. Positioned within the outer shaft and below a bottom end of the inner shaft is a roller. Attached to the bottom end of the inner shaft is a supplemental tube having a ramp integrally formed therewith. A thin rod extends through the inner shaft, connected at one end to the roller and at the other end to a button.

A spring biases the button, along with the attached thin rod, from an upper end of the inner shaft to cause the roller to ride up the ramp. As the roller rides up the ramp, it engages the inner wall of the outer shaft. The friction between the roller, the inner wall of the outer shaft, and the ramp attached to the inner shaft prevents relative movement between the inner shaft and the outer shaft. To allow relative movement between the inner shaft and the outer shaft, the button can be depressed against the biasing force of the spring to move the thin rod downwardly, causing the roller attached to the end of the thin rod opposite the button to ride down the ramp and away from the inner wall of the outer shaft.

Although functional, the garment rack adjustment mechanism described hereinabove disadvantageously tends to bind up, where depression of the button does not consistently result in movement of the roller down the ramp to permit relative sliding between the inner and outer shafts. As the roller and the ramp are positioned entirely within the outer shaft, access thereto when the adjustment mechanism is bound up is difficult.

Several factors cause the garment rack adjustment mechanism described above to bind up. One particular problem is when the thin rod becomes off-center, causing the roller to likewise become off-center on the ramp. The roller comprises two rotating wheel members, one on each side of an axle connected to the thin rod. The thin rod is significantly thinner than the inner diameter of the inner shaft. Thus, because the thin rod is only supported by a constriction at its upper extreme, its lower extreme having the roller attached can significantly move within the inner shaft and cause one of the rotating wheel members to be in greater frictional contact between the inner wall of the outer shaft and the ramp than the other, thereby causing the adjustment mechanism to bind up.

Another particular problem with the garment adjustment mechanism described above is the configuration of the ramp, which both contributes to the binding up of the mechanism and is costly to manufacture. The ramp is a separate tube that is attached to the end of the inner shaft. A portion of the tube is cut away at an inclined angle at one opening thereof, and a flat piece of sheet metal is cut into a curved profile and welded thereto. The piece of sheet metal only partially covers the opening in the supplemental tube, and the thin rod and attached roller project through the uncovered portion of the opening. Not only does such a complicated construction increase the cost of the adjustment mechanism, but it also results in a limited range of movement of the roller along the piece of sheet metal before the thin rod contacts the piece of sheet metal. For example, the roller travels only about 0.25 inches down the ramp, even though the ramp is about 1.25 inches in length, before the contact between the thin rod and the ramp lifts the roller from the ramp. When such contact occurs, the roller may lift off of the ramp and not properly engage both the sidewall of the outer tube and the ramp. Further contributing to the minimal travel of the roller along the ramp before the thin rod lifts it therefrom is the sharp angle of the ramp, which is about 23 degrees. If sufficient force is exerted on the roller to press it back down against the ramp, thereby bending the thin rod against the piece of sheet metal, the friction engagement between the roller, the ramp, and the inner wall of the outer shaft may be greater than desirable, which may result in binding of the mechanism and difficulty an adjusting the relative positions of the inner and outer shafts.

Further, the opening is sized to allow the roller to retreat thereinto, which can undesirably result in the roller becoming lodged within the inner tube. In addition, the entire thin rod can easily be withdrawn from the inner tube, contributing to both assembly and operational difficulties.

Problems with the above-described adjustment mechanism are increased when a pair of garment rack adjustment mechanisms are used, one for each of the pair of outer and inner shafts. When one of the adjustment mechanisms binds up and the other does not, or does so to a lesser degree, one of the pair of shafts slide relative to each other to a different extent that the other of the pair of shafts. This can further result in even more binding, as the skewing of one of the pair of shafts relative to the other of the pair of shafts can add to the likelihood of a bound adjustment mechanism.

SUMMARY

There is provided a new improved method and apparatus for adjusting the relative position between a pair of elongate, tubular shafts using an adjustment mechanism. This is achieved by using a wedge element shiftable between a wedged position wherein relative movement between the pair of shafts is substantially prevented and an unwedged position permitting relative movement between the pair of shafts. In the wedged position, the wedge element is frictionally engaged between a ramp and an inner wall of one of the shafts. An actuator member, having a first end region attached to the wedge element and a second end region opposite therefrom, is operable to shift the wedge element between the wedged and unwedged positions to control the relative movement between the pair of shafts. Binding of the adjustment mechanism may be reduced by supporting the actuator member in more than one location to maintain desirable contact between the wedge element and the ramp and the inner wall of the one of the pair of shafts. Binding of the adjustment mechanism may also be reduced by providing for an increased range of movement of the wedge element along the ramp to prevent undesirable frictional engagement between the actuator member and the ramp. Further, a stop may be provided to substantially maintain the wedge element from unintentionally withdrawing into the inner shaft.

An apparatus is provided for adjusting the relative position between two elongate, tubular shafts. The apparatus includes an outer elongate tubular shaft having a diameter and an inside wall. Also included is an inner elongate tubular shaft having a diameter different from the diameter of the outer shaft in order to permit the inner shaft to be slidably received at least partially within the outer shaft. An adjustment mechanism comprising a wedge element, a ramp, and an actuator member is positioned to allow for adjustments in the relative positioning between the inner and outer shafts. A ramp is positioned within the outer shaft and has an inclined surface. The wedge element is rideable along the inclined surface of the ramp between the wedged position and the unwedged position. The wedge element is moveable between a wedged position, wherein it is disposed in frictional engagement between the inner wall of the outer shaft and the ramp, and an unwedged position generally removed from the inner wall of the outer shaft. The wedged positioned substantially prevents relative movement between in the inner and outer shafts. Conversely, the unwedged position of the wedge element permits relative movement between the inner and outer shafts. The actuator member is at least partially received within the inner shaft and is operably connected to the wedge element for shifting the wedge element along the inclined surface of the ramp between the wedged position and the unwedged position. The actuator member includes a first end region operably connected to the wedge element and a second end region opposite from the first end region. The first and second end regions of the actuator member are each substantially supported by supports effective to generally maintain the position of the actuator member relative to the inner shaft and the wedge element operably attached to the first end region of the actuator member to facilitate accurate shifting of the wedge element between the wedged position and the unwedged position.

The inner shaft may have an internal end disposed within the outer shaft and an opposite end disposed external of the outer shaft. The ramp may be connected to the end of the inner shaft disposed within the outer shaft, and the inclined surface of the ramp may be inclined downwardly away from the end region of the inner shaft.

The support at the first end region of the actuator member may comprise a slot that is formed in the ramp. The ramp may comprise a pair of opposing sidewalls having upper and lower edges. The lower edges of the sidewalls may be connected by a bottom wall. The upper edges of the sidewalls may comprise the inclined surface of the ramp. The ramp may comprise a piece of sheet metal that has been folded at the intersections of the sidewalls and the bottom wall thereof. The support at the second end region of the actuator member may comprise a centering member disposed on the external end of the inner shaft and having an aperture through which the actuator member is slidable.

A biasing mechanism may be operably connected to the actuator member to provide a biasing force urging the wedge element, operably connected to the first end region of the actuator member, toward the unwedged position, where relative movement between the inner and outer shafts is substantially prevented. The actuator member may have an actuator control operably attached to the second end region thereof and disposed external to the inner shaft. The actuator control may permit shifting of the actuator member, and the wedge element attached to the first end region thereof, against the biasing force of the biasing mechanism to shift the wedge element toward the unwedged position, whereby relative movement between the inner and outer shafts is permitted. The actuator member may have a flexible portion disposed between its first and second end regions. The flexible portion of the actuator member can allow for the actuator control attached to the second end region of the actuator member to be in a nonlinear alignment relative to the wedge element attached to first end region of the actuator member. Thus, the flexible portion allows for the actuator member to be operable within a curved or angled inner shaft.

A pair of the apparatus may be provided for use in an adjustable garment rack. The adjustable garment rack may include a base portion having the outer shafts of the apparatus disposed at opposite ends thereof in an upstanding manner. A garment hanging rod having the inner shafts of the apparatus disposed at opposite ends thereof may be spaced above the base member effective to permit use of the garment hanging rod for hanging garments. The spacing between the base portion and the garment hanging rod may be adjustable using the adjustment mechanism of the apparatus.

A method is provided of forming an apparatus for adjusting the relative position between two elongate, tubular shafts. The method includes providing an outer elongate tubular shaft having a diameter and an inside wall. The method further includes providing an inner elongate tubular shaft having a diameter selected to be less than the diameter of the outer shaft, thereby permitting the inner shaft to be at least partially slidably received within the outer shaft. The method further comprises positioning a ramp within the outer shaft and having an inclined surface on the ramp. The method also includes positioning a wedge element within the outer shaft. The wedge element is moveable along the ramp between a wedged position, wherein the wedge element is disposed in frictional engagement between the inner wall of the outer shaft and the ramp, and an unwedged position generally removed from the inner wall of the outer shaft. The wedge element is rideable along the inclined surface of the ramp between the wedged position and the unwedged position. When the wedge element is in the wedged position, relative sliding movement between the inner and outer shafts is substantially prevented. Conversely, when the wedge element is in the unwedged position, relative movement between the inner and outer shafts is permitted. The method also includes connecting an actuator member, at least partially received within the inner shaft, to the wedge element for shifting the wedge element along the inclined surface of the ramp between the wedged position and the unwedged position. The method further includes supporting a first end region of the actuator member, having the wedge element connected thereto, relative to the inner shaft with a first support. The method also includes supporting a second end region of the actuator member, opposite the first end region, relative to the inner shaft with a second support. The use of the first and second supports assists in maintaining the alignment of the actuator member to relative to the inner shaft in order to generally maintain the positioning of the wedge element for correct shifting thereof between the wedged and unwedged positions.

The inner shaft may have an internal end disposed within the outer shaft and an opposite end disposed external of the outer shaft. The method may include the step of connecting the ramp to the end region of the inner shaft, positioned within the outer shaft, and downwardly inclining the inclined surface of the ramp away from the end region of the inner shaft.

The step of supporting the first end region of the actuator member with a first support may additionally include the step of forming a slot in the ramp and aligning at least a portion of the first end region of the actuator member within the slot. The method may also include forming the ramp by folding a piece of sheet metal to have a pair of opposing sidewalls, where the opposing sidewalls have upper and lower edges. The lower edges of the sidewalls may be connected with a bottom wall.

The method may also include the step of supporting the second end region of the actuator member with a second support, including the step of attaching a centering member to the inner shaft and aligning at least a portion of the second end region of the actuator member within an aperture in the centering member. By aligning the first and second end regions of the actuator member with the supports, the position of the actuator member within the inner tube may be generally maintained for facilitating accurate shifting of the wedge element between the wedged and unwedged positions.

The method may also include the step of operably connecting a biasing mechanism to the actuator member to provide a biasing force urging the wedge element, operably connected to the first end region of the actuator member, toward the wedged position. The method may also include the step of attaching an actuator control to the second end region of the actuator member. The actuator control may be disposed external to the inner shaft in order to permit shifting of the actuator member, and the wedge element attached to the first end region thereof, against the biasing force of the biasing mechanism in order to shift the wedge element to the unwedged position. The method may also include providing the actuator member with a flexible portion disposed between the first and second end regions thereof. The flexible portion may permit the actuator control attached to the second end region of the actuator member to be in nonlinear alignment relative to the wedge element attached to the first end region of the actuator member. The flexible portion thus allows for control of the wedge element using the actuator control when the inner tube is curved or has bends therein.

An apparatus is provided for adjusting the relative position between two elongate, tubular shafts. The apparatus includes an outer elongate, tubular shaft having a diameter and an inside wall. The apparatus further includes an inner elongate, tubular shaft having a diameter selected to be less than the diameter of the outer shaft, thereby permitting the inner shaft to be slidable at least partially within the outer shaft. Wedge means are positioned within the outer shaft. The wedge means are shiftable between a wedged positioned substantially preventing relative movement between the inner and outer shafts and an unwedged positioned substantially permitting relative movement between the inner and outer shafts. Actuator means for shifting the wedge means between the wedge position and the unwedged position are also provided. The actuator means may have a first end region and a second end region opposite the first end region. First support means effective to generally maintain the position of the first end region of the actuator means are provided. Further, second support means effective to generally maintain the position of the second end region of the actuator means are also provided. The use of the first and second support means combine to generally maintain the positions of the actuator means, and the wedge means attached thereto, relative to the inner tube for controlling the position of the wedge means.

An adjustable garment rack is also provided. The adjustable garment rack includes a base having a pair of upstanding tubular outer shafts attached to opposing end regions thereof. A pair of upstanding tubular inner shafts are each slidably received within the outer shafts. A garment rod extends between the upstanding inner shafts and are spaced a distance from the base. An adjustment mechanism is provided between each of the inner and outer shafts in order to permit adjustment of the relative positioning between the inner and outer shafts to adjust the distance between the garment rod and the base. The adjustment mechanism includes a ramp attached to the inner shaft and positioned within the outer shaft. An actuator member having one end attached to a wedge element slidable along the ramp is also provided. The wedge element is slidable along the ramp between a wedge position wherein the wedge element substantially prevents relative movement between the inner and outer shafts in an unwedged position permitting relative movement between the inner and outer shafts. The actuator member is biased by a biasing mechanism to shift the wedge element to the wedged position. The actuator member is shiftable against the biasing force of the biasing mechanism to shift the wedge element to the unwedged position. A pair of supports are positioned to generally maintain the alignment of the actuator member relative to the inner shaft. By maintaining the alignment of the actuator member, the wedge element attached to the one end of the actuator member can more precisely be maintained in the proper position within the outer shaft.

BRIEF DESCRIPTION OF THE DRAWINGS

FIG. 4 is a sectional view of the elongate, tubular shafts of FIG. 1 showing the adjustment mechanism in an unengaged position permitting relative movement between the elongate, tubular shafts;

FIG. 5 is a section view of the elongate, tubular shafts of FIG. 1 showing the adjustment mechanism in an engaged position substantially preventing relative movement between the elongate, tubular shafts;

DETAILED DESCRIPTION OF THE DRAWINGS

Figure 1:
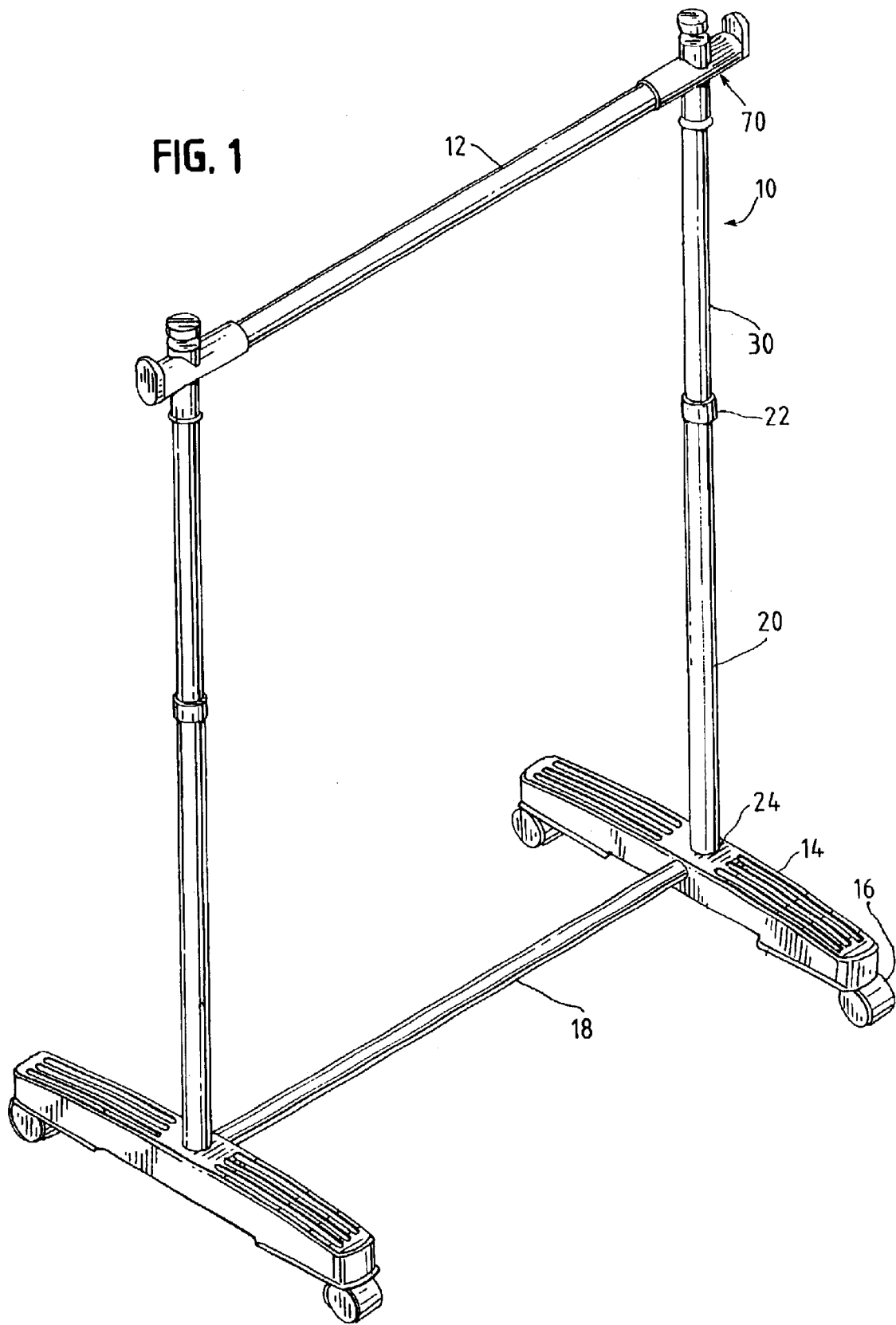
FIG. 1 is a perspective view illustrating a single rod garment rack having elongate, tubular shafts slidably adjustable using an adjustment mechanism.

As shown in the drawings for purposes of illustration, there are illustrated embodiments of an apparatus for adjusting the relative position between two elongate, tubular shafts in FIGS. 1–7. The adjustment mechanisms shown are for permitting the selective adjustment of the relative positioning between an inner elongate shaft 30 and an outer elongate shaft 20. The adjustment mechanism comprises a wedge element 42 positioned within the outer shaft 20 that is slidable along a ramp 50 connected to the inner shaft 30 toward the inner wall of the outer shaft 20. When the wedge element 42 is frictionally engaged between the inner wall of the outer shaft 20 and the ramp 50, relative movement between the inner and outer shafts 30 and 20 is substantially prevented.

Figure 2:
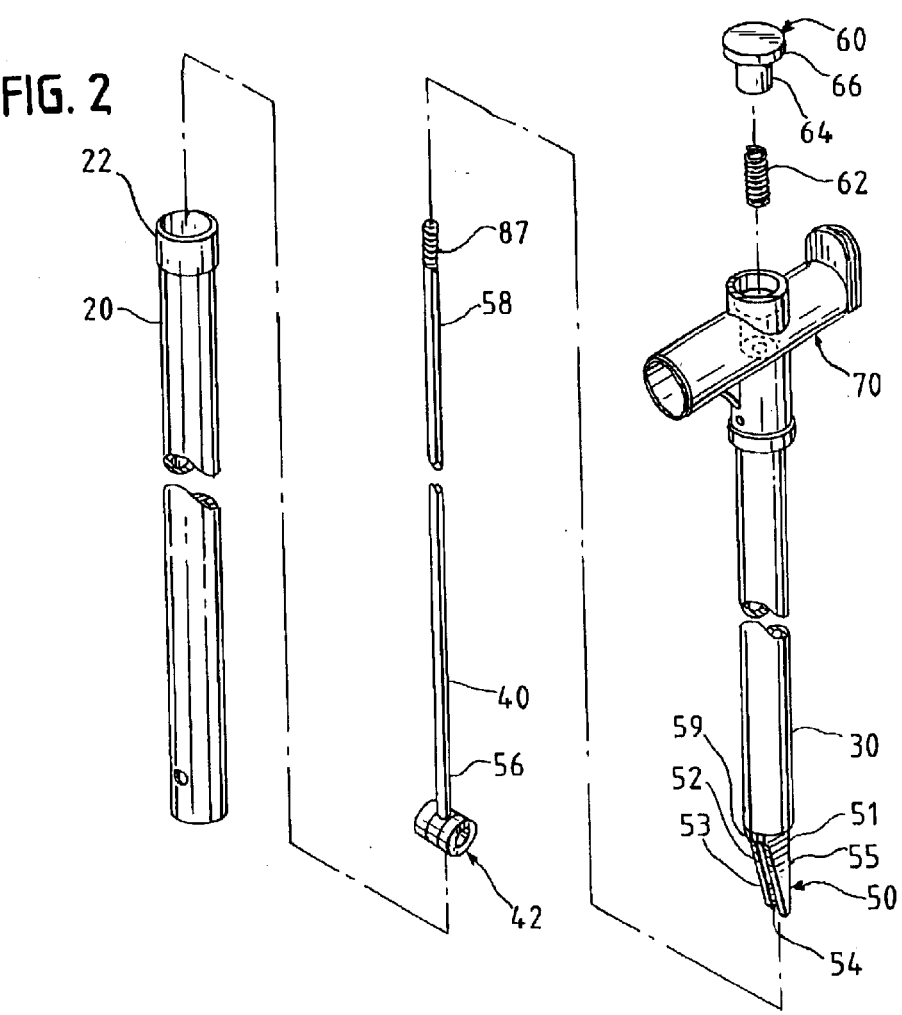
FIG. 2 is an exploded perspective view of the elongate, tubular shafts of FIG. 1 showing the adjustment mechanism for adjusting the relative position of a pair of elongate, tubular shafts.
Figure 3:
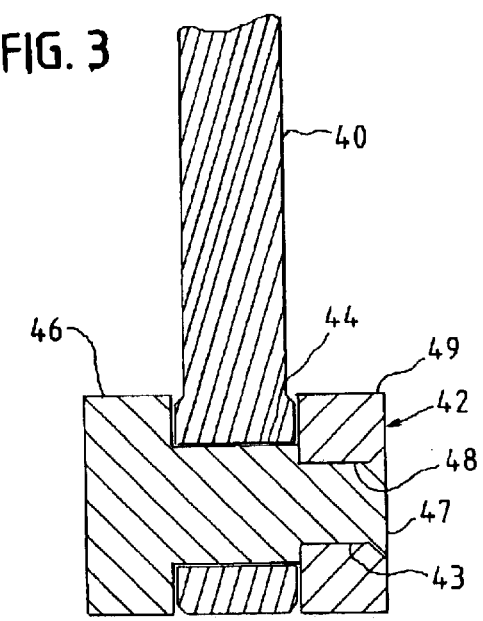
FIG. 3 is a sectional view of a wheel assembly of the adjustment mechanism of FIG. 2.

As shown in FIG. 2, the adjustment mechanism comprises an outer hollow shaft 20. An inner hollow shaft 30, having a diameter less than a diameter of the outer shaft 20, is slidably received within the outer shaft 20. Attached to an end of the inner shaft, received within the outer shaft 20, is a ramp 50. On another end of the inner shaft 30, opposite the ramp 50, is a support assembly 70. An actuator member 40 is positioned within the inner shaft 30 and supported at an end region 58 thereof by the support assembly 70. At another end region 56 of the actuator member 40 is a wedge element 42, comprising a pair of wheels 46 and 49, as will be discussed further herein. At the end region 58 of the actuator member 40 supported by the support assembly 70 is an actuator control 60. The wedge element 42 and the end of the actuator member 42 attached thereto protrude beyond the end of the inner shaft 30 having the ramp 50. The wedge element 42 is positioned to contact the ramp 50 and move therealong, while the ramp 50 is configured to support at least a portion of the end region 56 of the actuator member 40 having the wedge element 42 attached thereto. By supporting opposing end regions 56 and 58 of the actuator member 40, the actuator member 40 is generally maintained in the appropriate position within the inner shaft 30 to facilitate accurate movement of the wedge element 42 along the ramp 50.

The wedge element 42 is shiftable between two positions, a wedged position and an unwedged position. In the wedged position, the wedge element 42 substantially prevents relative movement between the inner and outer shafts 30 and 20. The wedge element 42 is biased toward the wedged position by a biasing mechanism 62, as will be described in more detail herein. When the wedge element 42 is in the wedged position, the actuator control 60 can be shifted, thereby causing the actuator member 40 and thus the wedge element 42 to be pushed down the ramp 50, against the biasing force of the biasing mechanism 62 toward the unwedged position. In the unwedged position the wedge element 42 does not generally interfere with relative movement between the inner and outer shafts 30 and 20. The wedge element 42 is positioned at the lower end of the ramp 50 when in the unwedged position, as shown in FIG. 4, and out of contact with the inner wall of the outer shaft 20.

In the wedged position, the biasing mechanism 62 biases the actuator control 60, and thus the actuator member 40, in a direction away from the outer shaft 20. By biasing the actuator member 40 away from the outer shaft 20, the wedge element 42 is caused to ride up an inclined surface 52 of the ramp 50 until it is wedged between the inner wall of the outer shaft 20 and the ramp 50, as illustrated in FIG. 5. The frictional engagement between the ramp 50, the wedge element 42, and the inner wall of the outer shaft 20 substantially prevents relative movement between the inner and outer shafts 30 and 20. If downward force is applied in order to attempt to move the inner shaft 30 away from the outer shaft 20, the wedge element 42 is further driven up the inclined surface 52 of the ramp 50 and into even tighter frictional engagement between the ramp 50 and th inner wall of the outer shaft 20.

The ramp 50 comprises a wedge-shaped member attached to the end of the inner shaft 30 slidably received within the outer shaft 20. The inclined surface 52 of the ramp 50 tapers upwardly toward the end of the inner shaft 30. The inclined surface 52 is configured to permit the wedge element 42 to move therealong between the wedged and unwedged positions.

A slot 54 is formed in the ramp 50 to permit passage of the actuator member 40 therethrough and to support the actuator member 40 by generally maintaining the first end region 58 of the actuator member in a predetermined alignment relative to the inner and outer shafts 30 and 20. By generally maintaining the actuator member 40 in a predetermined alignment, the position of the wedge element 42 can also be kept in a generally predetermined alignment to more precisely control the shifting of the wedge element 42 between the wedged and unwedged positions.

The inclined surface 52 of the ramp 50 is preferably selected to have an angle and a length permitting the wedge element 42 to travel therealong throughout the range of movement between the shifting of the wedge element 42 between the wedged and unwedged positions. Both the length of the inclined surface 52 and the angle thereof contribute to the amount of contact between the wedge element 42 and the inclined surface 52 as the wedge element 42 shifts between the wedged and unwedged positions. Having the wedge element 42 in contact with the inclined surface 52 of the ramp 50 during its travel between the wedged and unwedged positions facilitates movement of the wedge element 42 between said positions, reducing the binding of the wedge element 42 and thus the malfunctioning of the adjustment mechanism.

The length of the inclined surface 52 is preferably between 1.5 and 2 inches, and is preferably about 1.75 inches. The inclined surface 52 is preferably angled by between 10 and 15 degrees, and is preferably about 12 degrees. However, the wedge element 42 does not need to travel along the entire length of the inclined surface 52, but it is preferable that the wedge element 42 travel along the portion of the inclined surface 52 that corresponds to the placement of the wedge element 42 as it shifts between the wedged and unwedged positions.

A stop 59 is formed on the ramp 50 to substantially prevent the wedge element 42 from being drawn into the inner shaft 30. Such a stop 59 advantageously reduces the likelihood that the wedge element 42 will become lodged within the inner shaft 30. Further, by ensuring positioning of the wedge element 42, and thus the actuator member 40 operably attached thereto, the assembly of the apparatus is simplified as the actuator member 40 is not able to fall out of the inner tube 30. The stop 59 is preferably formed adjacent the inner shaft 30, and is sized to permit the actuator member 40 to slide therethrough, but not the wedge element 42.

The ramp 50 preferably comprises a pair of opposing upstanding, sidewalls 51 and 53, each having upper and lower edges. The lower edges of the sidewalls are connected by a bottom wall 55. Thus, the slot 54 of the ramp 50 is formed between the sidewalls 51 and 53 and the bottom wall 55. The upper edges of the sidewalls 51 and 53 comprise the inclined surface 52 upon which the wedge element 42 is slidable. As described in more detail below, the wedge element 42 may comprise one or more wheels 46 and 49 that roll along the upper edges of the inclined sidewalls 51 and 53. The ramp 50 preferably has a notch 57 or an aperture formed therein, permitting a portion of the inner shaft 30 to be deformed thereinto to secure the ramp 50 relative to the inner shaft 30.

The ramp 50 is preferably formed by folding a preshaped piece of sheet metal. In particular, the preshaped piece of sheet metal can be folded to bend the upstanding sidewalls 51 and 53 from the bottom wall 55. The ramp 50 preferably has the notch 57 or an aperture formed therein, permitting a portion of the inner shaft 30 to be deformed thereinto to secure the ramp 50 relative to the inner shaft 30. Although sheet metal is described, other materials, such as plastics or polymers, may be equally suitable. Similarly, although folding the sheet metal is described, other methods of forming the ramp 50 may be equally suitable.

The actuator member 40 comprises a shaft having a diameter less than the inner diameter of the inner shaft 30 so that the actuator member 40 is receivable therein and able to move relative to the inner shaft 30. The wedge element 42 is attached the one end region 56 of the actuator member 40, as described in greater detail below. The actuator control 60 is positioned at an opposite end of the actuator member 40. Preferably, the actuator member 40 extends through the entire length of the inner shaft 30. However, shorter lengths of the actuator member 40 may also be suitable. For example, the second region 58 of the actuator member 40 may be within the inner shaft 30, such as at the midpoint thereof. In such an example, a slot may be formed within the sidewall of the inner shaft 30 and the actuator control disposed to project through the slot to allow for operation of the actuator member 40 external from the inner shaft 30.

When it is desirable to have the actuator member 40 operably in a non-linear manner, a flexible portion 41 thereof can be provided. The flexible portion 41 permits the actuator member 40 to travel around bends and curves in the inner shaft 30, allowing for non-linear positioning of the actuator control 60 relative to the wedge element 42 and increasing the versatility of the adjustment mechanism. Rigid portions 56 and 58 of the actuator member 40 may be attached at opposite ends of the flexible portion 41. The flexible portion 41 preferably is not significantly compressible, thereby minimizing the amount of extra travel of the actuator control 60 required to shift the wedge element 42 between the wedged and unwedged positions, as compared to a non-flexible actuator member 40.

The flexible portion 41 of the actuator member 40 preferably comprises a tightly wound coil spring. However, the tightly wound coil spring exerts minimal biasing spring force to reduce the amount of spring force required to depress the actuator control 60 and shift the actuator member 40. The coil spring is advantageously flexible, thereby permitting the actuator member 40 to negotiate bends and angles, such as may be in the inner shaft 30.

The wedge element 42 may comprise a wheel pair 46 and 49 having an axle 48 therebetween. A aperture 44 may be formed in the end of the actuator member 40 in order to rotatably receive the axle 48. In one particular form, illustrated in FIG. 3, one of the wheels 46 is integrally formed with the axle 48. The axle 48 then passes through the aperture 43 formed in the other of the wheels 49 and has a flattened end 47 in order to relatively secure the other of the wheels 49 to the axle 48. The use of a wheel pair 46 and 49 permits the wedge element 42 to roll along the ramp 50. The rolling of the wheel pair 46 and 49 along the ramp 50 can assist in movement of the wedge element 42 from the wedged position to the unwedged position. Although a wheel pair 46 and 49 has been described in detail herein, other types of wedge elements 42 are also suitable for use in the adjustment mechanism. For example, a non-rolling cylinder or pie-shaped wedge may also be used for frictional engagement between the inner wall of the outer shaft 20 and the ramp 50.

The use of a wheel pair 46 and 49, or any such pair of wedge portions of the wedge element 42, permit one of each of the pair 46 and 49 to slid or roll along the inclined surface 52 of the ramp 50. When the pair of wedge portions are disposed on either side of the actuator member 40, and the second end region of the actuator member 56 is at least partially positioned within the slot 54 of the ramp 50, contact can generally be maintained between the ramp 50 and the wedge portions in both the wedged and unwedged positions. That is, the wedge portions preferably do not lift up from the inclined surface 52, such as if the actuator member 40 is supported by the ramp 50 to a degree that raises the wedge portions from the inclined surface 52. Thus, the slot 54 in the ramp 50 is configured to reduce binding of the wedge element 42 and to facilitate accurate shifting of the wedge element 42 between the wedged and unwedged positions.

The support assembly 70 is disposed at the end of the inner shaft 30 opposite the end received within the outer shaft 20. The support assembly 70 has multiple functions, including maintaining the position of the actuator member 40, providing a portion of the mechanism for biasing the wedge element 42 toward the wedged position, and for connecting the inner shaft 30 relative to a garment rod 12.

The support assembly 70 comprises an upper portion 82, a lower portion 72, and a side connection portion 80, as illustrated in FIGS. 4 and 5. The lower portion 72 of the support assembly is a downwardly depending cylindrical sleeve configured to slide over the upper end of the inner shaft 30. An aperture 74 is formed in the sleeve that is alignable with an aperture 32 formed in the sidewall of the inner shaft 30. A pin, screw, or other similar fixation device can be inserted through the sleeve and inner shaft apertures 74 and 32 to secure the support assembly 70 to the inner shaft 30.

A separator wall 84 is positioned between the upper and lower portions 82 and 72 of the support assembly 70. The separator wall 84 has an aperture 78 therethrough, permitting the second end region 58 of the actuator member 40 to be inserted therethrough in order to generally maintain the second end region 58 of the actuator member 40 in a centered position relative to the diameter of the inner shaft 30. The side of the separator wall 84 facing the lower portion 72 of the support assembly 70 has a conical depression 86 surrounding the aperture 78 therethrough. The conical depression 86 is sloped toward the aperture 78 in order to facilitate insertion of the actuator member 40 through the aperture 78.

The upper portion 82 of the support assembly 70, opposite the separator wall 84 from the lower portion 72 of the support assembly 70, includes an upwardly extending sleeve having an open end opposite the separator wall 84. An actuator control 60 comprising a knob is attached to the second end region 58 of the actuator member 40 proximate the sleeve. The actuator member 40 has at its second end region a male threaded portion 87. The knob 60 has a corresponding female threaded portion 89 adapted to receive the male threaded portion 87 of the actuator member 40 to secure the knob 60 to the actuator member 40.

The knob 60 has a cylindrical body portion 64 capped with a cap portion 66. The cylindrical body portion 64 has a diameter configured to be slidably received within the upstanding sleeve of the upper portion 82 of the support assembly 70. Preferably, the diameter of the cylindrical body portion 64 is selected to be slightly smaller that the inner diameter of the sleeve, thereby acting as a support to maintain the actuator member 40 in a centered position relative to inner shaft 30. The diameter of the cap portion 66 of the knob 60 is selected to be larger than the diameter of the upstanding sleeve of the upper portion 82 of the support assembly 70 to prevent the knob 60 from completely being inserted into the sleeve. For example, when the knob 60 is depressed to shift the wedge element 42 to the unwedged position, as illustrated in FIG. 4, the cap portion 66 of the knob engages a rim 83 of the sleeve to prevent further movement thereof.

Positioned within the sleeve is a biasing mechanism 62 comprising a coil spring configured to bias the actuator member 40 in a direction away from the outer shaft 20. The spring 62 is compressed between the separator wall 84 of the support assembly 70 and the bottom end of the cylindrical portion 64 of the knob 60. The spring 62 biases the knob 60 in an outwardly direction from the upstanding sleeve of the upper portion 82 of the support assembly 70, thereby causing the attached actuator member 40 to shift the wedge element 42 into the wedged position frictionally engaged between the inner wall of the outer shaft 20 and the ramp 50 to substantially prevent relative movement between the inner and outer shafts 20. The spring 62 is preferably selected to have a spring constant selected to provide sufficient biasing force to urge the wedge element 42 into the wedged position. However, the spring constant is preferably not so large so as to provide a biasing force that cannot manually be overcome by depressing the knob 60 partially into the sleeve to shift the wedge element 42 to the unwedged position to permit adjustment of the relative positions between the inner and outer shafts 20. Although a coil spring is described herein and illustrated, other biasing mechanisms may be equally suitable. For example, disc springs may be used to bias the actuator control 60.

Positioned along either the upper or lower portions 82 or 72 of the support assembly 70, or along both, is the side connection portion 80, as shown in FIGS. 4 and 5. The side connection portion 80 comprises a sleeve for receiving the garment rod 12 for securing the garment rod 12 relative to the support assembly 70 and thus the inner shaft 30.

The support assembly 70 is preferably a unitary part formed by injection molding a polymer or plastic. Preferably, the inner diameter of the sleeve is sized to frictionally receive an end of the garment rod 12, although other connections may be provided therebetween. For example, if the support assembly 70 is formed from metal, a pin or dowel connection may be provided between the garment rod 12 and the support assembly 70.

Preferably the respective sleeves of the upper and lower portions 82 and 72 of the support assembly 70 are generally centered about a common axis. The common axis is also preferably share the same axis as the inner and outer shafts 30 and 20. The actuator member 40 is preferably positioned along both axes.

Although the adjustment mechanism is described above as including inner and outer shafts 30 and 20, the adjustment mechanism is equally suitable for use in adjusting the relative positioning between three or more telescopingly arranged shafts. For example, there may be an outer shaft, an intermediate shaft received within the outer shaft, and an inner shaft received within the intermediate shaft. In such a configuration, the actuator member 40 may be positioned to pass through both the inner and intermediate shafts and into the outer shaft.

The inner and outer shafts 30 and 20 have been described as being hollow. However, it is not necessary that the entirety of the inner and outer shafts 30 and 20 be hollow. For example, either or both of the inner and outer shafts 30 and 20 may have just a portion that is hollow to accommodate the actuator member 40.

The adjustment mechanism described above may be used for adjusting the elevation of a garment rod 12 of a garment rack 10, as illustrated in FIG. 1. The garment rack may include a pair of base members 14. The base members 14 preferably each include a pair of wheels 16 attached to the bottoms thereof in order to allow the garment rack 10 to be easily rolled on floor surfaces. The base elements 14 are attached by a transverse connection rod 18 to provide additional stability thereto. An aperture 24 is formed in each of the base elements in order to receive one of the pair of upstanding outer shafts 20. The inner shafts 30 are slidably received within the outer shafts 20. A ferrule 22 may be positioned on the upper end of the outer shaft 20 to provide aesthetic appeal, cover any sharp edges of the exposed upper end of the outer shaft 20, and to assist is centering and sliding of the inner shaft 30 relative to the outer shaft 20. Located on the end of the inner shaft 30 opposite the end received within the outer shaft 20 is the support assembly 70 adapted for connection to the garment rod 12. When assembled, the garment rod 12 is supported above the base members 14 between the support assemblies 70 on each of the respective inner shafts.

The adjustment mechanism, as described above, can be used to adjust the vertical spacing between the garment rod 12 and the base elements 14. For example, it may be desirable to hang a longer article, such as pants, on the garment rod 12 in a form that allows the article to hang along its entire length. Conversely, if a shorter article, such as a shirt, is hung from the garment rod 12, it may be desirably to lower the height of the garment rod 12 in order to reduce the amount of vertical space occupied by the garment rack 10.

Figure 6:
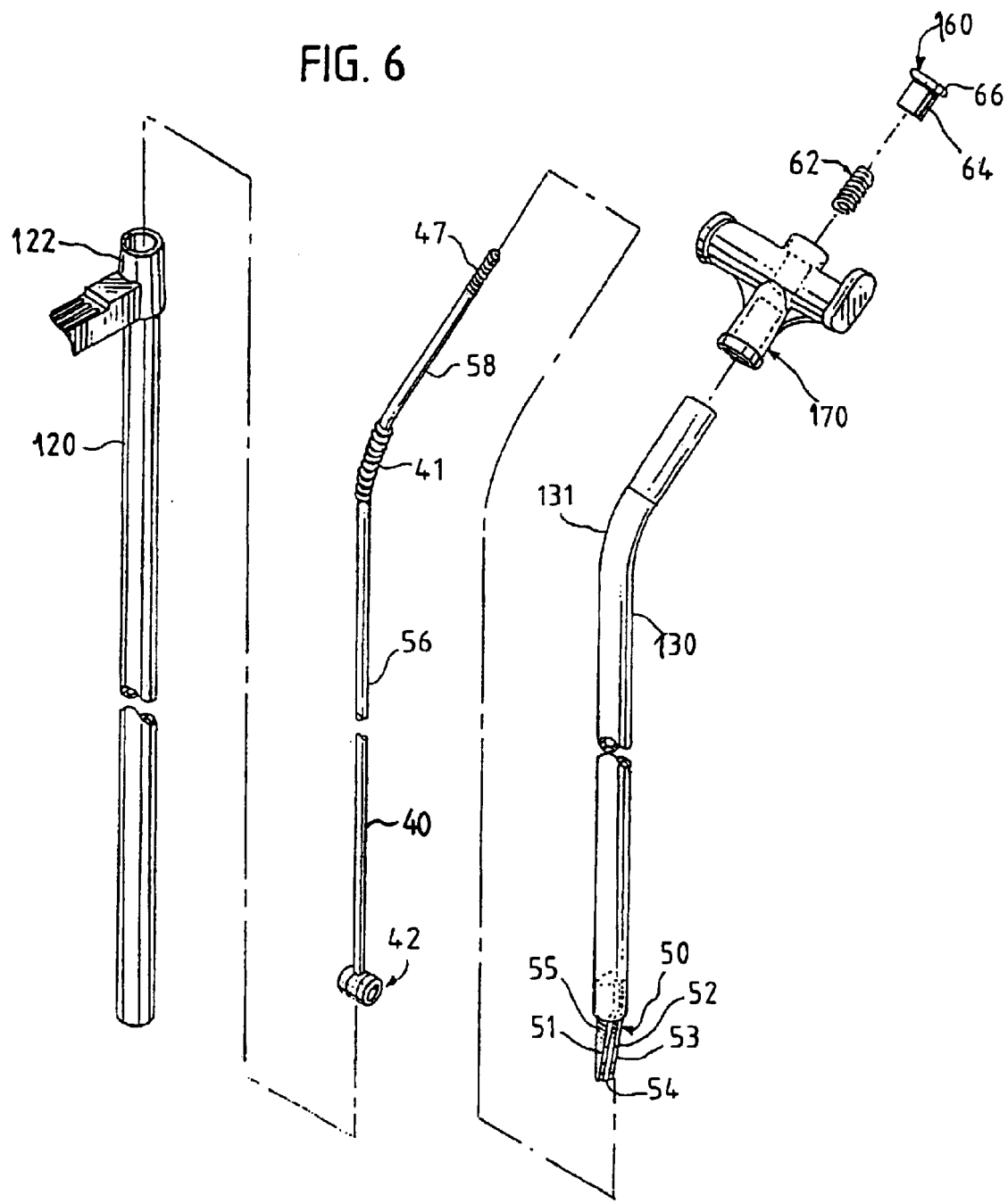
FIG. 6 is a perspective view illustrating a dual rod garment rack having elongate, tubular shafts slidably adjustable using an adjustment mechanism.
Figure 7:
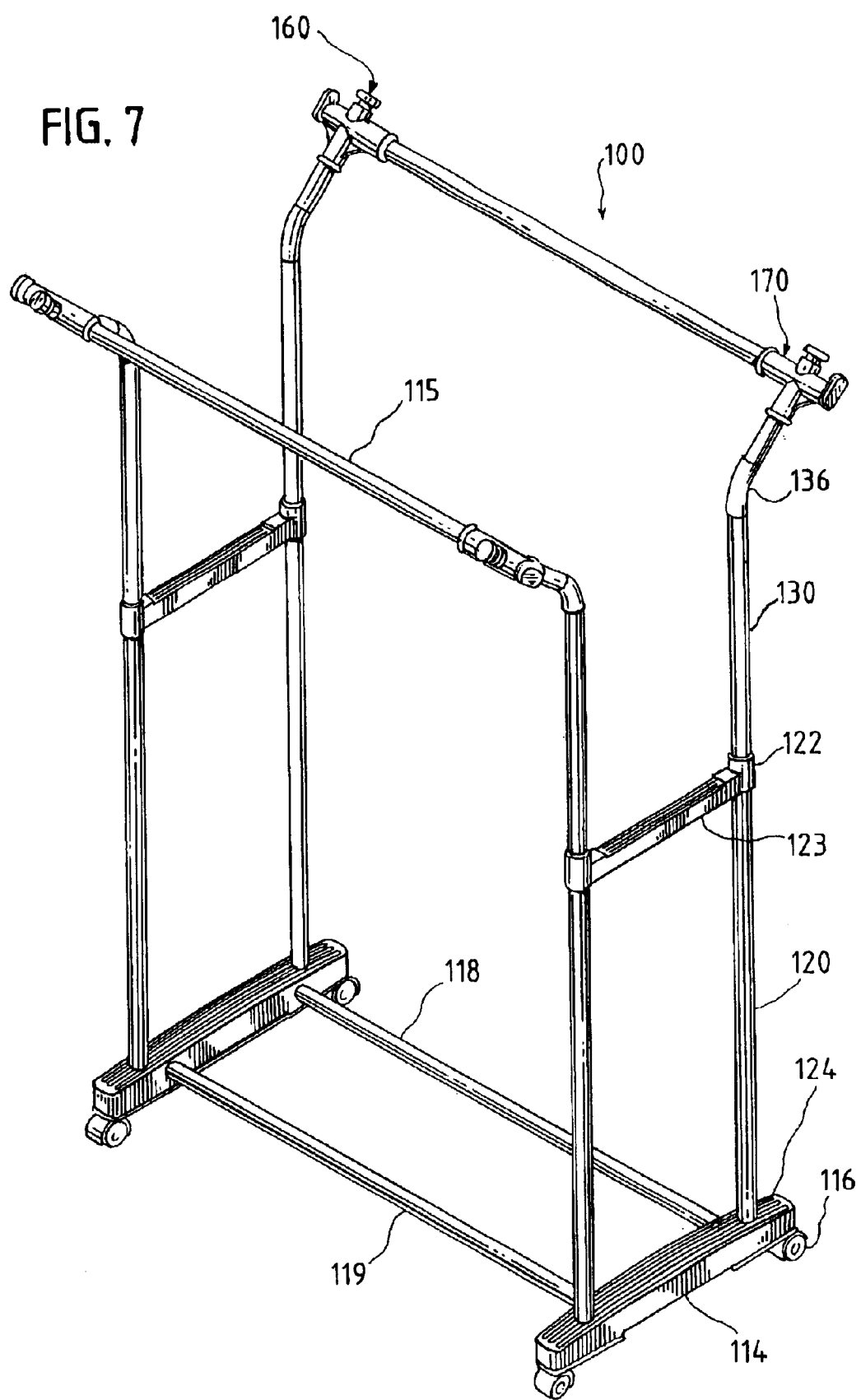
FIG. 7 is an exploded perspective view of the elongate, tubular shafts of FIG. 1 showing the adjustment mechanism for adjusting the relative position of a pair of elongate, tubular shafts.

As shown in FIGS. 6 and 7, the adjustment mechanism may be used in a dual rod garment rack 100. The dual rod garment rack 100 includes two garment rods 112 and 115 spaced a distance apart in order to provide more space for hanging articles. The dual garment rack 100, like the single garment rack 10 described herein above, includes a pair of base elements 114. The base elements 114 may each include a pair of wheels 116 in order to allow for easy maneuvering of the garment rack 100. The base elements 114 are connected via a pair of transverse elongate support shafts 118 and 119 to provide stability to the rack 100. The dual garment rack 100 includes a pair of upstanding outer shafts 120, attached to each of the base members 114 via insertion into sockets 124 in the base members 114, resulting in a total of four upstanding outer shafts 120. Each of the upstanding outer shafts 120 also includes an inner shaft 130 at least partially slidably received within the outer shaft 120. Attached to the upper end of each inner shaft 130 is a support assembly 170, similar to the support assembly 70 discussed above. Each of the four assemblies of the inner and outer shafts 130 and 120 are aligned with another of the assemblies on opposite base members 114. Positioned along the upper ends of the outer shafts 120 are ferrules 122, similar to the ferrules 22 described above. Cross supports 123, each being substantially parallel to the base elements 114, extend between ferrules 122. The cross supports 123 provide additional stability to the garment rack 100.

In order to maintain a proper distance between the garment rods 112 and 115 attached to the upper ends of the inner shafts 130, the inner shafts 130 are curved away from each other. That is, the upper ends of the inner shafts 130 on each of the base elements 114 are curved away from the center of the garment rack 100. In this manner, proper spacing between the garment rods 112 and 115 extending between opposing inner shafts 130 is maintained in order to allow for garments to be hung on both rods 112 and 115 with minimal interference therebetween. Actuator members 40 having flexible portions 41, as described above and illustrated in FIG. 6, are used in the dual rod garment rack 100 to allow the actuator members 40 to bend around curved portions 131 of the inner shafts 130. Knobs 160 are attached to the upper ends of the actuator members 40, similar to the knobs 60 described above.

Although the adjustment mechanism described above is described in conjunction with garment racks 10 and 100, the adjustment mechanism may be used in many other devices. For example, the adjustment mechanism described above may be used when the relative positioning between an inner and outer shaft is desirable. For example, legs of a table may incorporate telescopingly slidable shafts fixable in position using the adjustment mechanism described herein in order to permit adjustments of the elevation of the table.

As can be appreciated from the above description of FIGS. 1–7, there is provided a new improved method and apparatus for adjusting the relative position between a pair of elongate, tubular shafts using an adjustment mechanism having a wedge element operably moveable along a ramp by shifting of an actuator member. The adjustment mechanism is configured to reduce binding thereof by supporting the actuator member in more than one location to maintain desirable contact between the wedge element and the ramp and the inner wall of the one of the pair of shafts, providing for an increased range of movement of the wedge element along the ramp to prevent undesirable frictional engagement between the actuator member and the ramp, and by providing a stop to substantially maintain the wedge element from unintentionally withdrawing into the inner shaft and wedged therein. While there have been illustrated and described particular embodiments, it will be appreciated that numerous changes and modifications will occur to those skilled in the art, and it is intended in the appended claims to cover all those changes and modifications which fall within the true spirit and scope thereof.

What is claimed is:

1. An apparatus for adjusting the relative position between two elongate, tubular shafts, the apparatus comprising:

an outer elongate, tubular shaft having a diameter and an inside wall;

an inner elongate, tubular shaft having a diameter, the diameter of the inner shaft being less than the diameter of the outer shaft permitting the inner shaft to be slidable at least partially within the outer shaft;

a wedge element positioned within the outer shaft, the wedge element movable between a wedged position disposed against the inner wall of the outer shaft and an unwedged position generally removed from the inner wall of the outer shaft, the wedged position substantially preventing relative movement between the inner and outer shafts and the unwedged position permitting relative movement between the inner and outer shafts;

a ramp positioned within the outer shaft and having an inclined surface, the wedge element ridable along the inclined surface of the ramp between the wedged position and the unwedged position; and an actuator member at least partially received within the inner shaft, the actuator member being operably connected to the wedge element for shifting the wedge element along the inclined surface of the ramp between the wedged position and the unwedged position, the actuator member having a first end region operably connected to the wedge element and a second end region, the first and second end regions both being substantially supported by supports within the inner shaft effective to generally maintain the position of the actuator member and the wedge member operably attached thereto.

2. The apparatus in accordance with claim 1, wherein the inner shaft has an internal end disposed within the outer shaft and an opposite end disposed external of the outer shaft, the ramp being connected to an end region of the inner shaft and having the inclined surface inclined downwardly away from the end region of the inner shaft.

3. The apparatus in accordance with claim 2, wherein a biasing mechanism is operably connected to the actuator member and provides a biasing force to urge the wedge element operably connected to the first end region of the actuator member to the wedged position substantially preventing relative movement between the inner and outer shafts.

4. The apparatus in accordance with claim 3, wherein the actuator member has an actuator control operably attached to the second end region thereof and disposed external to the inner shaft permitting shifting of the actuator member and the wedge element attached to the first end region thereof against the biasing force of the biasing mechanism to shift the wedge element to the unwedged position permitting relative movement between the inner and outer shafts.

5. The apparatus in accordance with claims 4, wherein the actuator member has a flexible portion disposed between the first and second end regions thereof permitting the actuator control attached to the second end region of the actuator member to be in a non-linear alignment relative to the wedge element attached to the first end region of actuator member.

6. The apparatus in accordance with claim 4, wherein an upstanding pair of the apparatus is used in an adjustable garment rack, the adjustable garment rack comprising:

a base portion having the outer shafts of the apparatus disposed at opposite ends thereof; and a garment rod having the inner shafts of the apparatus operably connected thereto, the garment rod being spaced from the base portion effective to permit use of the garment rod for hanging garments, the spacing between the base portion and the garment rod being adjustable using the apparatus.

7. The apparatus in accordance with claim 1, wherein the support at the first end region of the actuator member comprises a slot formed in the ramp.

8. The apparatus in accordance with claim 7, wherein the ramp comprises a pair of opposing sidewalls having upper and lower edges, the lower edges of the sidewalls being connected by a bottom wall and the inclined surface of the ramp being the upper edges of the sidewalls opposite the bottom wall.

9. The apparatus in accordance with claim 8, wherein the ramp comprises a piece of sheet metal folded at the intersections of the sidewalls and the bottom wall thereof.

10. The apparatus in accordance with claim 7, wherein the support at the second end region of the actuator member comprises a centering member disposed on the external end of the outer shaft, the centering member having a surface for abutting against the actuator member to generally maintain the actuator member in alignment relative to the outer shaft.

11. A method of forming an apparatus for adjusting the relative position between two elongate, tubular shafts, the method comprising:

providing an outer elongate, tubular shaft having a diameter and an inside wall;

providing an inner elongate, tubular shaft having a diameter, the diameter of the inner shaft being less than the diameter of the outer shaft permitting the inner shaft to be slidable at least partially within the outer shaft;

positioning a wedge element within the outer shaft, the wedge element movable between a wedged position disposed against the inner wall of the outer shaft and an unwedged position generally removed from the inner wall of the outer shaft, the wedged position substantially preventing relative movement between the inner and outer shafts and the unwedged position permitting relative movement between the inner and outer shafts;

positioning a ramp within the outer shaft and having an inclined surface, the wedge element ridable along the inclined surface of the ramp between the wedged position and the unwedged position;

connecting an actuator member at least partially received within the inner shaft to the wedge element for shifting the wedge element along the inclined surface of the ramp between the wedged position and the unwedged position;

supporting a first end region of the actuator member having the wedge element connected thereto relative to the inner shaft with a first support; and supporting a second end region of the actuator member opposite the first end region relative to the inner shaft with a second support.

12. The method in accordance with claim 11, wherein the inner shaft has an internal end disposed within the outer shaft and an opposite end disposed external of the outer shaft, including the steps of connecting the ramp to an end region of the inner shaft and downwardly inclining the inclined surface away from the end region of the inner shaft.

13. The method in accordance with claim 12, including operably connecting a biasing mechanism to the actuator member to provide a biasing force urging the wedge element operably connected to the first end region of the actuator member to the wedged position substantially preventing relative movement between the inner and outer shafts.

14. The method in accordance with claim 13, including attaching an actuator control to the second end region of the actuator member and disposed external to the inner shaft to permit shifting of the actuator member and the wedge element attached to the first end region thereof against the biasing force of the biasing mechanism to shift the wedge element to the unwedged position permitting relative movement between the inner and outer shafts.

15. The method in accordance with claim 14, including providing the actuator member with a flexible portion disposed between the first and second end regions thereof permitting the actuator control attached to the second end region of the actuator member to be in a non-linear alignment relative to the wedge element attached to the first end region of actuator member.

16. The method in accordance with claim 11, wherein the step of supporting the first end region of the actuator member with a first support comprises forming a slot in the ramp and aligning at least a portion of the first end region of the actuator member within the slot.

17. The method in accordance with claim 11, comprising forming the ramp by folding a piece of sheet metal to have a pair of opposing sidewalls having upper and lower edges, the lower edges of the sidewalls being connected with a bottom wall.

18. The method in accordance with claim 11, wherein the step of supporting the second end region of the actuator member with a second support comprises attaching a centering member to the inner shaft and aligning at least a portion of the second end region of the actuator member within an aperture of the centering member.

19. An apparatus for adjusting the relative position between two elongate, tubular shafts, the apparatus comprising:

an outer elongate, tubular shaft having a diameter and an inside wall;

an inner elongate, tubular shaft having a diameter, the diameter of the inner shaft being less than the diameter of the outer shaft permitting the inner shaft to be slidable at least partially within the outer shaft;

wedge means positioned within the outer shaft, the wedge means shiftable between a wedged position substantially preventing relative movement between the inner and outer shafts and an unwedged position substantially permitting relative movement between the inner and outer shafts;

actuator means operably attached to the wedge means for shifting the wedge means between the wedged position and the unwedged position, the actuator means having a first end region and a second end region opposite the first end region;

first support means effective to generally maintain the position of the first end region of the actuator means; and second support means effective to generally maintain the position of the second end region of the actuator means.

20. An adjustable garment rack comprising:

a base;

a pair of upstanding tubular outer shafts attached to opposing end regions of the base;

a pair of upstanding tubular inner shafts, each of the inner shafts being slidably received within the outer shafts;

a garment rod extending between the upstanding tubular inner shafts and spaced a distance from the base; and an adjustment mechanism provided between each of inner and outer shafts permitting adjustment of the relative position between the inner and outer shafts to adjust the distance between the garment rod and the base, the adjustment mechanism having a ramp attached to the inner shaft and within the outer shaft, an actuator member at least partially received within the inner shaft having one end attached to a wedge element slidable along the ramp between a wedged position wherein the wedge element engages the outer shaft to substantially prevent relative movement between the inner and outer shafts and an unwedged position permitting relative movement between the inner and outer shafts, the actuator member being biased by a biasing mechanism to shift the wedge element to the wedged position, and the actuator member shiftable against the biasing force of the biasing mechanism to shift the wedge element to the unwedged position, and a pair of supports for generally maintaining the position of the actuator member within the inner shaft.

21. The adjustable garment rack in accordance with claim 20, wherein:

a second pair of upstanding tubular outer shafts are attached to opposing end regions of the base;

a second pair of upstanding tubular inner shafts are slidably received within the second pair of outer shafts, each of the upstanding inner and outer shafts having an adjustment mechanism therebetween; and a second garment rod extends between the second pair of upstanding tubular inner shafts and is spaced a distance from the base.

22. The adjustable garment rack in accordance with claim 21, wherein the first and second pair of upstanding tubular inner shafts each include a non-linear portion effective to position the first and second garment rods a predetermined distance apart, and the actuator members include flexible portions sufficient to enable non-linear operation of the wedge elements using the actuator members.

23. An adjustable garment rack comprising:
   a base;
   a pair of upstanding tubular outer shafts attached to opposing end regions of the base;
   a pair of upstanding tubular inner shafts, each of the inner shafts being slidably received within the outer shafts;
   a garment rod extending between the upstanding tubular inner shafts and spaced a distance from the base;
   a second pair of upstanding tubular outer shafts are attached to opposing end regions of the base;
   a second pair of upstanding tubular inner shafts are slidably received within the second pair of outer shafts;
   a second garment rod extends between the second pair of upstanding tubular inner shafts and is spaced a distance from the base; and
   an adjustment mechanism provided between each of the inner and outer shafts permitting adjustment of the relative position between the inner and outer shafts to adjust the distance between the garment rod and the base, the adjustment mechanism having a ramp attached to the inner shaft and within the outer shaft, an actuator member at least partially received within the inner shaft having one end attached to a wedge element slidable along the ramp between a wedged position wherein the wedge substantially prevents relative movement between the inner and outer shafts and an unwedged position permitting relative movement between the inner and outer shafts, the actuator member being biased by a biasing mechanism to shift the wedge element to the wedged position, and the actuator member shiftable against the biasing force of the biasing mechanism to shift the wedge element to the unwedged position, and a pair of supports for generally maintaining the position of the actuator member within the inner shaft, wherein the first and second pair of upstanding tubular inner shafts each include a non-linear portion effective to position the first and second garment rods a predetermined distance apart, and the actuator members include flexible portions sufficient to enable non-linear operation of the wedge elements using the actuator members.

\* \* \* \* \*